US011009144B2

(12) United States Patent
Nguyen

(10) Patent No.: US 11,009,144 B2
(45) Date of Patent: May 18, 2021

(54) SOLENOID CONTROL VALVE

(71) Applicant: RB Distribution, Inc., Colmar, PA (US)

(72) Inventor: Tam Van Nguyen, Philadelphia, PA (US)

(73) Assignee: RB Distribution, Inc., Colmar, PA (US)

( * ) Notice: Subject to any disclaimer, the term of this patent is extended or adjusted under 35 U.S.C. 154(b) by 72 days.

(21) Appl. No.: 16/239,233

(22) Filed: Jan. 3, 2019

(65) Prior Publication Data

US 2020/0217429 A1 Jul. 9, 2020

(51) Int. Cl.
*F16K 31/06* (2006.01)
*F16K 27/04* (2006.01)

(52) U.S. Cl.
CPC ........ *F16K 31/0613* (2013.01); *F16K 27/048* (2013.01)

(58) Field of Classification Search
CPC ... F16K 27/041; F16K 27/048; F16K 31/0613
USPC .................................................... 251/129.15
See application file for complete search history.

(56) References Cited

U.S. PATENT DOCUMENTS

| | | | | |
|---|---|---|---|---|
| 4,524,803 A * | 6/1985 | Stoll | ..................... | F16K 27/041 137/625.64 |
| 4,988,074 A * | 1/1991 | Najmolhoda | ...... | G05D 16/2024 251/129.08 |
| 5,611,370 A * | 3/1997 | Najmolhoda | ....... | F16K 31/0613 137/625.61 |
| 5,984,259 A * | 11/1999 | Najmolhoda | ...... | G05D 16/2024 251/50 |
| 6,209,563 B1 | 4/2001 | Seid et al. | | |
| 6,321,767 B1 * | 11/2001 | Seid | .................... | F16K 31/0613 137/15.21 |
| 6,774,753 B2 * | 8/2004 | Shirase | ................... | B60T 8/363 251/129.15 |
| 6,869,060 B2 * | 3/2005 | Barber | ................ | F15B 13/0405 251/30.02 |
| 7,488,161 B2 * | 2/2009 | Inoue | ..................... | F04B 53/10 123/467 |
| 7,673,597 B2 * | 3/2010 | Najmolhoda | ........... | B03C 1/286 123/90.12 |
| 7,938,143 B2 * | 5/2011 | Nagasaki | ............ | F16K 31/0613 137/625.68 |
| 8,225,818 B1 * | 7/2012 | Stephens | ............. | F15B 13/0402 137/512.15 |
| 8,408,232 B2 * | 4/2013 | Schisler | .................. | F15B 1/027 137/102 |
| 2003/0025581 A1 * | 2/2003 | Rudisil | ................. | H01F 7/1607 335/220 |
| 2003/0084946 A1 * | 5/2003 | Douglass | ................ | F16D 48/02 137/625.64 |

(Continued)

*Primary Examiner* — Seth W. Mackay-Smith
(74) *Attorney, Agent, or Firm* — Volpe Koenig

(57) ABSTRACT

A solenoid assembly made with a one-piece metallic valve body having: a closed end; an open end; a central opening that communicates with multiple ports and an attachment portion adjacent to the open end. A movable armature positioned in the central opening has a free end that extends beyond the open end. A coil bobbin receives the free end of the movable armature and acts in response to electrical signals. The housing enclosing the coil bobbin attaches to the valve body to unify the coil bobbin and valve body as a solenoid.

7 Claims, 4 Drawing Sheets

(56) References Cited

U.S. PATENT DOCUMENTS

| | | | |
|---|---|---|---|
| 2004/0238775 A1* | 12/2004 | Mills | F16K 31/0668 251/129.14 |
| 2004/0257185 A1* | 12/2004 | Telep | H01F 7/13 335/220 |
| 2008/0283352 A1* | 11/2008 | Purvines | F16D 27/112 192/84.1 |
| 2015/0240795 A1* | 8/2015 | Yoshihiro | F04B 27/1804 251/129.15 |
| 2016/0201822 A1* | 7/2016 | Takada | F01L 1/3442 251/129.15 |

\* cited by examiner

SOLENOID CONTROL VALVE

FIELD OF INVENTION

The invention relates generally to a solenoid and more particularly to an engine oil solenoid control valve for controlling oil pressure.

BACKGROUND

Modern internal combustion engines use oil or hydraulic system for performing internal engine functions beyond just parts lubrication. These additional functions can be performed by a hydraulic control valve in a valve housing mechanically connected to an operating solenoid. The solenoid typically includes a solenoid coil bobbin on which a wire coil is wound, an armature that activates and deactivates the control valve in response to an input signal to the wire coil to control hydraulic pressure in the valve lifter oil control gallery. A check valve assembly mounted in a fluid exhaust passage of the engine block or cylinder head and functions to maintain oil pressure at a predetermined pressure.

One example of such solenoid control valve is described in U.S. Pat. No. 6,209,563.

Most known solenoid control valves are made with molded plastic which has been known to fatigue or deform because of engine heat. As a result of this loss of structural integrity, the internal ball check valves leak or malfunction.

Because the known solenoid assemblies comprise numerous small parts and are known to suffer from fluid leakage, it has been suggested to mold the solenoid structure as one piece, however there continue to be issues of structural integrity and durability.

It is an object of the present invention to provide a solenoid control valve that is easier to assemble and less prone to leakage. It is a further object of the invention to provide a metallic spool valve.

SUMMARY

The present solution provides a solenoid control valve assembly having an oil control vale or OCV spool valve and a coil bobbin. The body of the spool valve is made from a metal, preferably aluminum, and the coil bobbin is secured to the spool valve coil with a bobbin housing or can that is crimped to the spool valve and secures the spool valve and bobbin together as a solenoid unit.

BRIEF DESCRIPTION OF THE DRAWINGS

The features and advantages of the invention will be apparent from the detailed description made in connections with the following drawings in which.

DETAILED DESCRIPTION OF A PREFERRED EMBODIMENT

Figure 1:
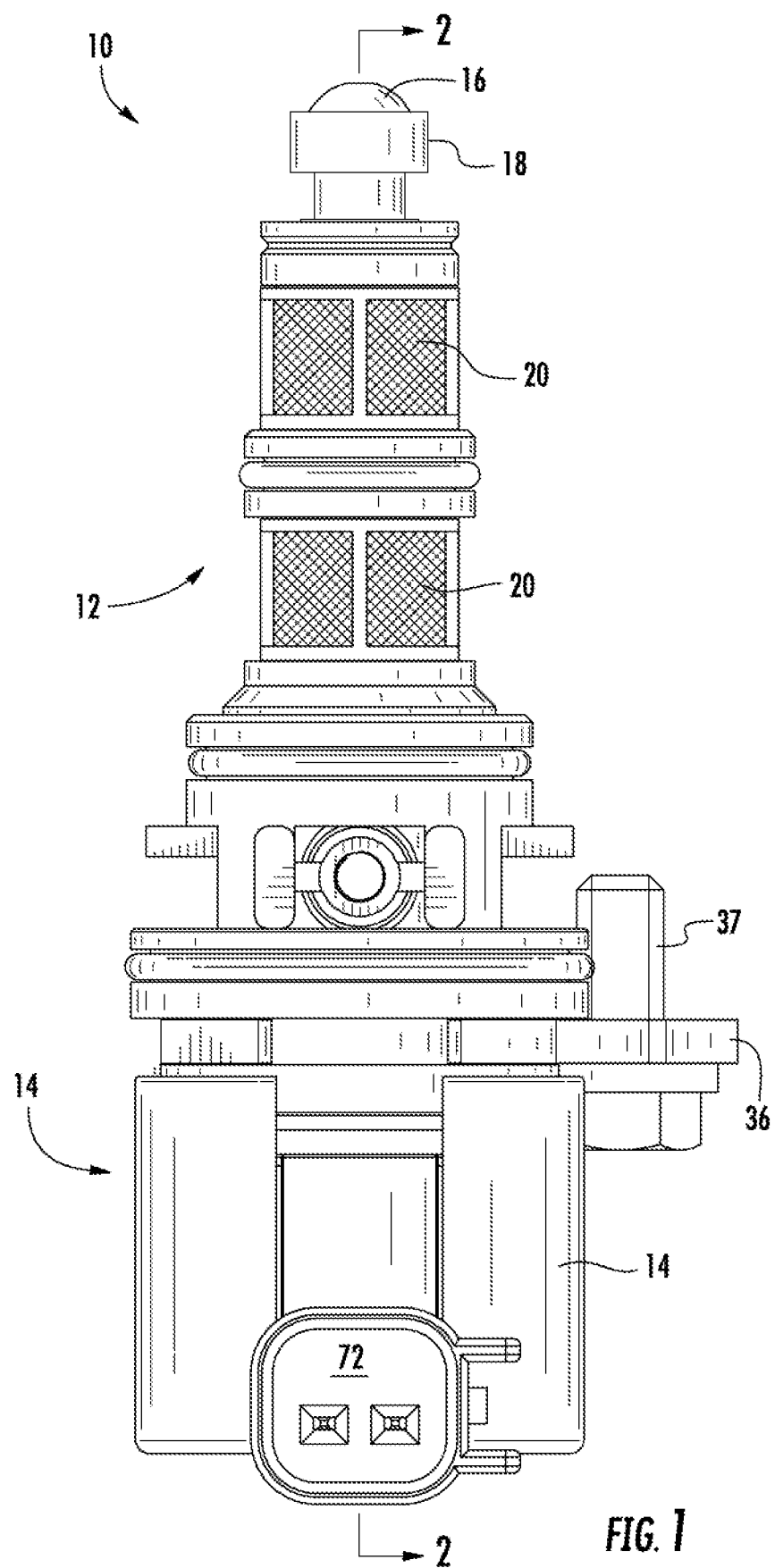
FIG. 1 is a plan view illustrating the general construction of the invention for a modern engine.

As discussed earlier, solenoids perform a number of functions in modern engines. The following is a description of how the solenoid functions in one engine to control the number of active cylinders. These engines are also referred to as Multiple Displacement System engines.

Chrysler introduced a Multiple Displacement System (MDS) version of the 5.7 L HEMI engine in the 2005 Chrysler 300C and Dodge Magnum, and described its operation as follows.

This engine can deactivate four of the eight cylinders, and operate as a 4-cylinder engine during periods of low load, improving fuel economy and emissions.

The MDS provides the 5.7 L engine with the fuel economy of a V6 while maintaining the performance of a V8. The fuel economy improvement is estimated to be up to 20 percent, depending on driving conditions. The MDS operation, invisible to the driver, is fully integrated into the fuel injection system.

When the MDS solenoids are in the "off" state (8-cylinder mode), they supply oil pressure of approximately 3 psi to the lifter bores. This lifter oil keeps the bores lubricated and prevents air from entering the system. When the solenoids are activated or in the "on" state, oil pressure of 16 psi or greater is supplied to the lifters and the engine enters the 4-cylinder mode.

When the special lifters are supplied high oil pressure by the solenoid, pins inside the lifter move inward. This unlocks the outer portion of the lifter and allows it to move independently from the center portion of the lifter. The camshaft can move the outer portion of the lifter without transferring motion to the inner portion of the lifter.

During the 8-cylinder mode, solenoids are in the "off" state (deenergized). Minimal oil pressure is applied to the special lifter. They are working normally in this mode.

During the 4-cylinder mode, solenoids are in the "on" state (energized). High oil pressure is applied to the special lifters and the lifters become inactive and essentially the four pistons are along for the ride. Both valves are closed.

The power-train control module (PCM) will activate the 4-cylinder mode when the following enabling conditions are met:

Low engine load,
1200 to 3000 rpm,
Vehicle speed between 12 mph and 90 mph,
Battery voltage from 9 volts to 15 volts,
Oil pressure from 15 psi to 147 psi.
Oil temperature greater than 120 F,
Engine coolant temperature from 158 to 248 F.
Ambient temperature from 14 F to 248 F, and
No throttle position sensor or MDS faults.

The PCM deactivates solenoids one cylinder at a time in the firing order. If the system is "on" for long periods of time, such as a long flat road with no stopping, the system will return to the 8-cylinder mode approximately every six minutes to maintain engine temperature. The PCM will also unlock the torque converter before the transition, to minimize the effect on drivability.

The oil temperature sensor used for this system is a two-wire sensor, negative temperature coefficient, like the sensors for engine coolant temperature or intake air temperature (IAT). The PCM uses this input—along with oil pressure, load and rpm—to calculate oil viscosity and flow rate. This information is critical to MDS operation.

It's important to know this engine uses 5 W-20 engine oil. If the wrong oil is used, fault code P1521 can be set, and the vehicle may show symptoms of a shudder—to a torque converter shudder—when the MDS system is activated and deactivated. Other symptoms may include MDS performance codes or engine misfire codes.

Before spending a lot of time with these codes, use the vehicle service history to find out what type of oil is in the engine. Because this is not always possible, the next best thing is to replace the oil (and filter) with 5 W-20. This may have to be done twice to fully restore the system back to normal. Oil slugging, restricted oil passages or lifter contamination can also cause problems with this system.

Each MDS solenoid has about 12 ohms of resistance. When the solenoid is activated by applying 12 volts to it, an audible "click" can be heard from under the intake manifold. This test can be done with a jumper wire or by using the actuator test mode (ATM) mode of a compatible scan tool.

If the solenoid is mechanically stuck in the "on" position, the result will be one dead cylinder.

The basic operating principles of the invention are consistent with those found in the original equipment manufacturers (OEM) parts and need not be described in detail. The specific operational details of the valve will depend on the application. However, the operational details for an exemplary OEM valve are found in U.S. Pat. No. 6,209,563, which is incorporated herein as fully set forth.

The following description of the construction depicted in the drawing figures will relate to common operating features; however, the location(s) and number(s) of ports will vary by application. What is constant throughout the construction in accordance with the present invention is the provision of a metallic valve body and a bobbin in a solenoid assembly by folding a portion of the housing or can that holds the bobbin over a portion of the metallic valve body.

Referring now to FIG. 1, the solenoid 10 has a valve body 12, which contains the various functional inlet and outlet ports and the movable armature, and a bobbin housing or can 14, which contains the bobbin or coil windings. With reference to the sectional view in FIG. 2, the body 12 has a plurality of filters 20 that cover oil passages 30 and 34. In this configuration, passage 30 is a control port, passage 34 is a supply port and passage 32 is an exit port. At the far end opposite the housing 14, the armature 50 has a relief valve 22 positioned just below the cap 16, which is surrounded by a magnetic collar 18. The body 12 has a plurality of external O-rings 24, 26, 28 which are positioned on the body 12 according to the physical location of the solenoid in the engine.

Figure 2:
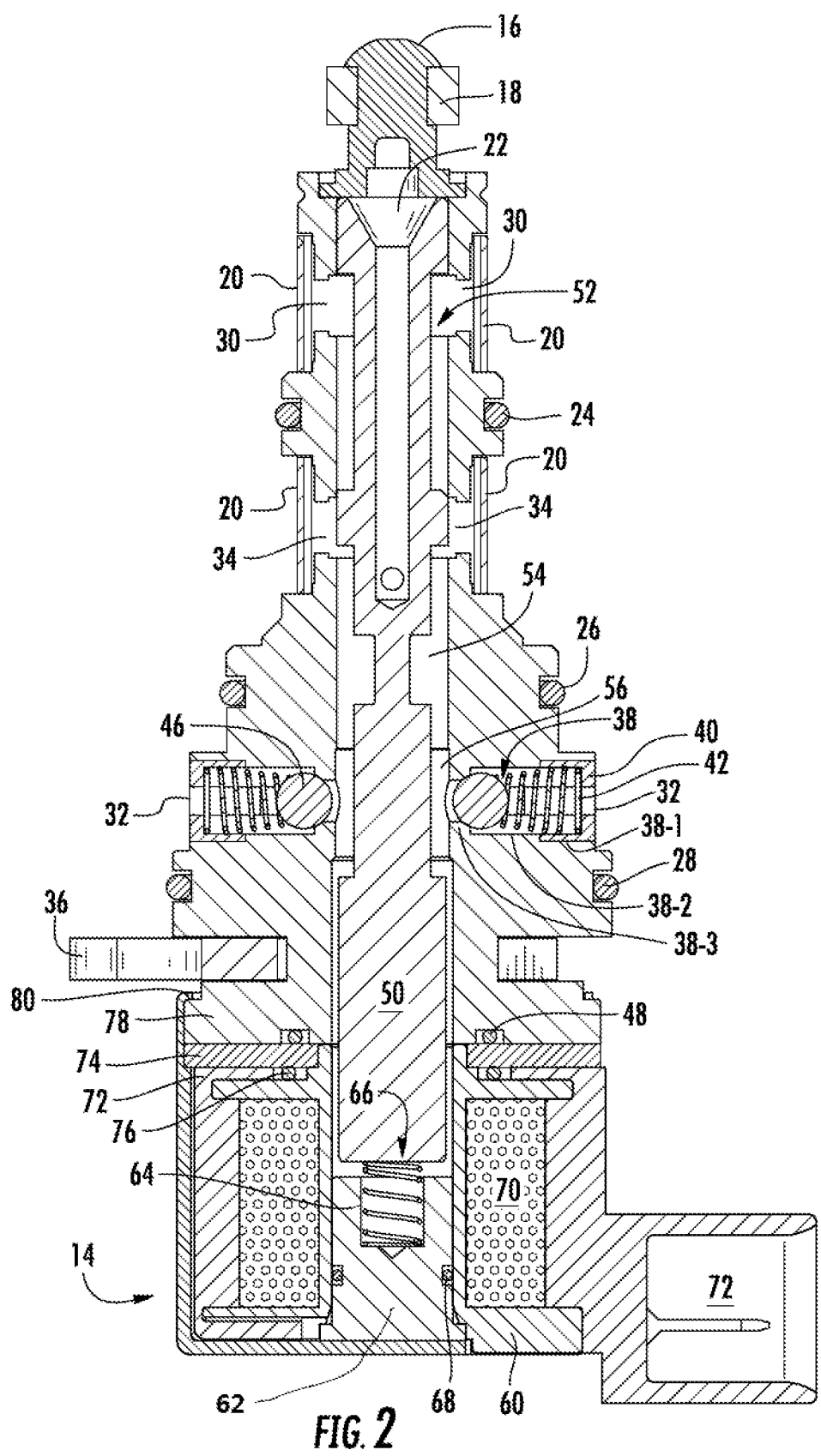
FIG. 2 is a section through FIG. 1 along the lines 2-2.

Still with reference to FIG. 2, there are a plurality of reliefs or recesses 52, 54, and 56 formed in the armature 50 so that movement of the armature will enable a fluid to flow around the armature to the desired port for the selected function. The exit port 32 has a channel or passage 38 that has a first dimension 38-1, a second dimension 38-2 and a third dimension 38-3. The first dimension 38-1 is sized to receive a spring retainer cap or cup 40 that fixes the spring 42 in channel 38 and receives an end portion of the spring within the cap or cup. The second dimension 38-2 is sized to hole the spring 42 and the ball check 46. Spring 42 urges the ball check 46 against the third dimension 38-3 and closes the passage 38 against a flow from relief or recess 56 until the pressure is sufficient to overcome the biasing spring 42. The remaining ports are unrestricted except for the filters 20.

Figure 3:
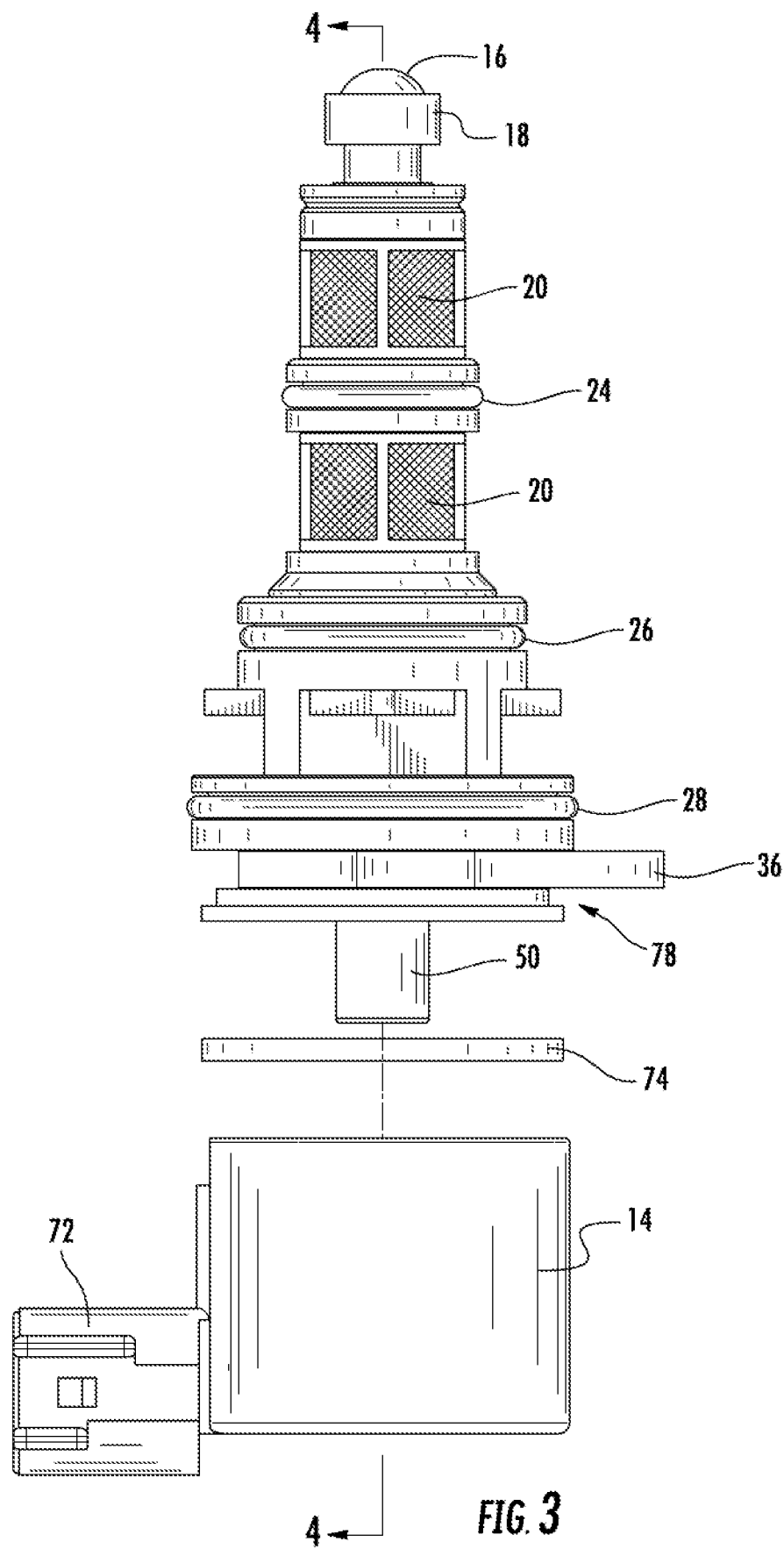
FIG. 3 is an exploded view illustrating the spool valve and bobbin housing or can before assembly; and, FIG. 4 is a section through FIG. 3 along the lines 4-4.

With reference to FIGS. 2 and 3, it can be seen the armature 50 extends blow the valve body base 78 and that there is an internal O-ring 48 fitted within the valve body 12.

The base 78 mates with the bobbin surround 72 which includes an electrical connection for activating the solenoid. The surround 72 includes a molded portion 60 that supports the bobbin. The molded portion 60 has a central pillar 62 with a central recess 64 that receives return or biasing spring 66. The internal O-ring 68 is recessed in pillar 62. The windings 70 of the bobbin are electrically connected with the OEM wiring harness.

Figure 4:
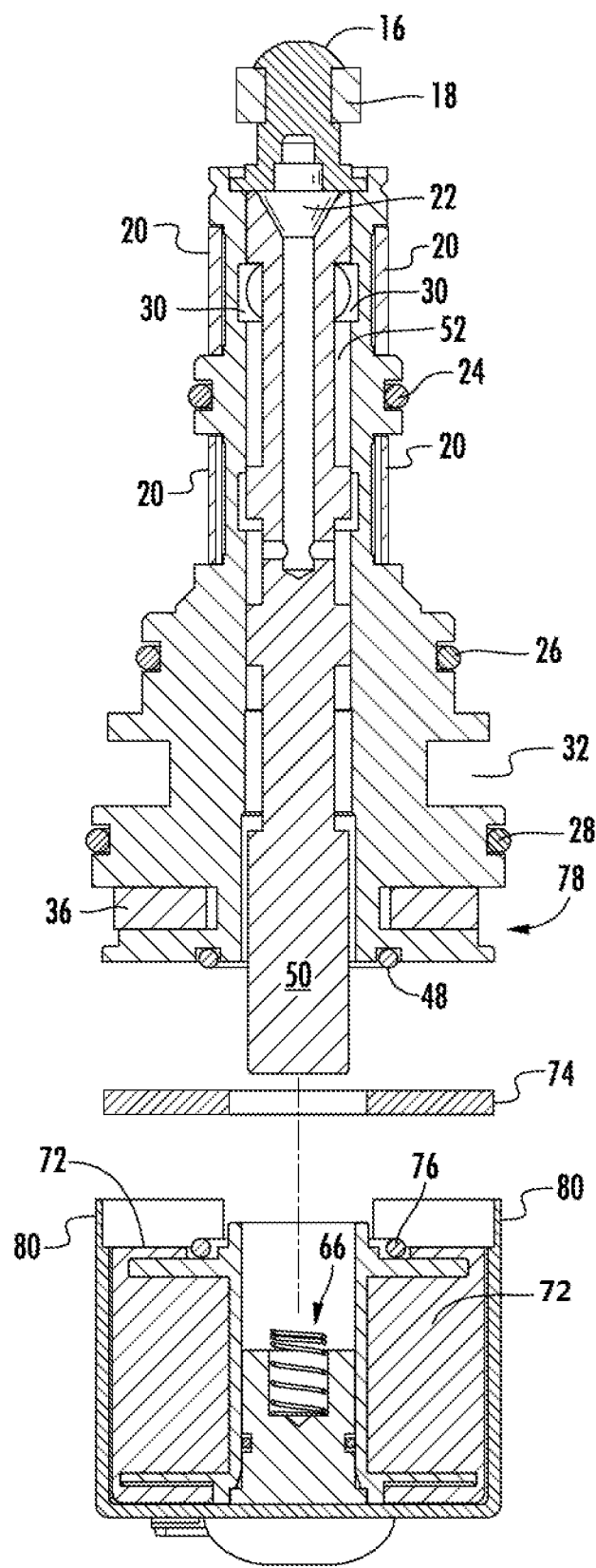

With reference to FIGS. 2 and 4, the molded portion 60 extends above the windings 70 to surround the free end of the armature 50 and define a shelf 72 that receives a grommet 74 and an internal O-ring 76. The grommet 74 is preferable made of a rigid material so that it provides resistance when tabs 80 are crimped over the valve body base 78. Alternatively, the grommet 74 may be a rigid center with a compressible layer on either surface to enhance sealing and possibly assist in crimping the tabs 80.

Because the described embodiment is intended for a particular engine, it includes a mounting bracket 36 with a through aperture for passing a bolt 37, see FIG. 1, that connects it to the designated engine position or location.

What is claimed is:

1. A hydraulic fluid solenoid comprising:
   a one-piece metallic valve body having: a closed end; an open end that includes a base portion; a central opening that extends between the closed end and the open end and communicates with a plurality of fluid ports;
   a movable armature has a first portion positioned in the central opening of the valve body and a second portion that extends beyond the base of the valve body;
   a bobbin wire windings and hap that define a central recess dimensioned to receive the second portion of the movable armature extending beyond the base;
   a bobbin surround supports the bobbin;
   a housing having a closed end and an open end that receives the bobbin surround and the valve body with the second portion of the movable armature extending beyond the base;
   a grommet with a central opening, the grommet is positioned on the bobbin surround within the housing and around the second portion of the movable armature, wherein the grommet completely surrounds the central recess in the bobbin; and,
   wherein the open end of the housing is crimped over the base of the valve body and the grommet stabilizes the bobbin surround within the housing.

2. The solenoid of claim 1, wherein at least one port of the plurality of ports is an exit port.

3. The solenoid of claim 2, wherein the exit port is comprised of a channel with multiple dimensions.

4. The solenoid of claim 2 wherein the exit port includes a ball check, biasing spring and a spring retainer.

5. The solenoid of claim 4, wherein an end portion of the biasing spring is positioned within the spring retainer.

6. The solenoid of claim 1, wherein the bobbin includes an electrical connector that receives electrical signals for controlling movement of the armature within the valve body.

7. The solenoid of claim 1, wherein the bobbin has a central pillar with a recess that receives a biasing element.

* * * * *

UNITED STATES PATENT AND TRADEMARK OFFICE
CERTIFICATE OF CORRECTION

PATENT NO. : 11,009,144 B2  
APPLICATION NO. : 16/239233  
DATED : May 18, 2021  
INVENTOR(S) : Tam Van Nguyen Page 1 of 1

It is certified that error appears in the above-identified patent and that said Letters Patent is hereby corrected as shown below:

In the Specification

In Column 2, Line 44, delete "psi." and insert -- psi, --, therefor.

In Column 2, Line 46, delete "F." and insert -- F, --, therefor.

In Column 2, Line 64, delete "shudder-to" and insert -- shudder-similar to --, therefor.

In Column 3, Line 18, delete "(OEM)" and insert -- (OEMs) --, therefor.

In Column 3, Line 60, delete "blow" and insert -- below --, therefor.

In the Claims

In Column 4, Line 32, in Claim 1, delete "wire windings and hap" and insert -- has wire windings --, therefor.

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*